United States Patent [19]

Toben

[11] Patent Number: 5,450,879
[45] Date of Patent: Sep. 19, 1995

[54] CORNERLESS SLIP-ON FLANGE SYSTEM FOR DUCT CONNECTIONS

[75] Inventor: John J. Toben, Cedar Rapids, Iowa

[73] Assignee: Met-Coil Systems Corporation, Cedar Rapids, Iowa

[21] Appl. No.: 260,477

[22] Filed: Jun. 14, 1994

[51] Int. Cl.6 ............................................. F16L 25/00
[52] U.S. Cl. ................................... 138/109; 138/155; 138/DIG. 4; 285/424
[58] Field of Search ................. 138/109, DIG. 4, 155, 138/120; 285/363, 424

[56] References Cited

U.S. PATENT DOCUMENTS

| | | |
|---|---|---|
| 6,428 | 5/1849 | Warner . |
| 565,499 | 8/1896 | Pattison . |
| 634,275 | 10/1899 | Schenck ........................ 138/DIG. 4 |
| 641,580 | 1/1900 | Cummins ....................... 138/DIG. 4 |
| 726,004 | 4/1903 | Stein et al. ..................... 138/DIG. 4 |
| 760,216 | 5/1904 | Laws ................................... 285/424 |
| 913,685 | 3/1909 | Boyd . |
| 2,275,572 | 3/1942 | Somers ......................... 138/DIG. 4 |
| 2,330,769 | 9/1943 | Wichner ............................... 285/424 |
| 2,396,030 | 3/1946 | Terry . |
| 2,498,753 | 2/1950 | Deitsch ................................ 285/424 |
| 2,709,454 | 5/1955 | Coulters .............................. 285/424 |
| 3,347,569 | 10/1967 | Lindgren . |
| 3,415,543 | 12/1968 | Keating . |
| 3,451,696 | 6/1969 | Hagelin . |
| 3,712,649 | 1/1973 | Martin . |
| 3,712,650 | 1/1973 | Mez . |
| 3,754,782 | 8/1973 | DeLord . |
| 3,923,326 | 12/1975 | Mez . |
| 3,934,905 | 1/1976 | Lockard . |
| 4,123,094 | 10/1978 | Smitka . |
| 4,218,079 | 8/1980 | Arnoldt . |
| 4,244,609 | 1/1981 | Smitka . |
| 4,252,350 | 2/1981 | Smitka . |
| 4,283,080 | 8/1981 | Nakajima . |
| 4,288,115 | 9/1981 | Sullivan . |
| 4,508,376 | 4/1985 | Arnoldt . |
| 4,542,923 | 9/1985 | LaCrosse . |
| 4,552,388 | 11/1985 | Meinig . |
| 4,564,227 | 1/1986 | Murck . |
| 4,584,756 | 4/1986 | Arnoldt . |
| 4,662,661 | 5/1987 | Arnoldt . |
| 4,679,832 | 7/1987 | Meining . |
| 4,995,648 | 2/1991 | Jackson . |
| 5,253,901 | 10/1993 | Hunter ........................... 138/DIG. 4 |

FOREIGN PATENT DOCUMENTS

| | | |
|---|---|---|
| 243931 | 5/1960 | Australia . |
| 594161 | 12/1977 | Switzerland . |
| 2038434 | 8/1978 | United Kingdom . |
| 2082282 | 8/1978 | United Kingdom . |

OTHER PUBLICATIONS

Nov. 1973, K-LOK Couplings Advertisement and Brochure.
Foreign Fittings for Air Conditioning Ducts Brochure.
Nexus Duct Connection System Brochure.
Verrolec Ltd. Price List and Verro-Mez Brochure.

Primary Examiner—James E. Bryant, III
Attorney, Agent, or Firm—James C. Nemmers

[57] ABSTRACT

A cornerless slip-on flange system for duct connections. The system utilizes flange pieces to form a frame at the end of a duct section without the use of connectors at the corners of the flanges, the frames of two sections being used to join the two ducts sections together. The flange pieces each have a male end and a female end with the male end of one flange piece being inserted into the female end of the adjacent flange piece at each corner to form the frame. The frames can then be installed on the ends of the ducts to be joined and fastened together by inserting suitable fasteners through preformed openings in the flange pieces.

3 Claims, 5 Drawing Sheets

CORNERLESS SLIP-ON FLANGE SYSTEM FOR DUCT CONNECTIONS

This invention relates generally to duct systems used in the heating, ventilating and/or air conditioning fields. The ducts typically are rectangular in cross section and are formed in sections that must be joined together to complete the system. More particularly, the invention relates to flange frames used in connecting adjacent duct sections together.

Duct joining systems are well known and are widely utilized to join together the ends of adjacent duct sections. When the sections are properly connected, the ducts are used to convey conditioned air from a central system to remote locations so as to provide heating, cooling and ventilation to these locations. The prior art teaches numerous, different flange systems for connecting the rectangular duct sections. One such system utilizes what are termed "slip-on" flanges which are roll formed metal pieces usually made in 10 or 20 foot random lengths that are cut-to-length in the shop or on the job site to fit the duct sections. These flange pieces are made in a variety of cross sectional configurations so as to accommodate gaskets, sealants and different mechanical fasteners. With the slip-on flange systems, the installers of the ducts use the roll formed metal flange pieces that have been produced in random lengths and cut them to the proper length. Then with the use of separate corner pieces, such as those shown in Arnoldt, U.S. Pat. No. 4,218,079, the flange and corner pieces are assembled into a frame which is then attached to the ends of the rectangular duct sections. The duct sections are then connected using suitable mechanical fasteners joining the frames.

With the slip-on flange systems of the prior art, each duct section requires four corners and four flange pieces to make a frame, and thus each duct connection requires eight corners and eight flange pieces. Because the average duct system in a commercial installation requires hundreds and sometimes thousands of joint connections, the cost of these connections using corner pieces adds to a considerable expense. In addition, the labor required to make up the flange frames by cutting the random lengths of roll-formed metal flange pieces to the proper length to make the flange frames adds to the installation costs as does scrap loss from the random lengths. There is also a certain amount of danger in cutting the random lengths of roll-formed flange pieces to length in the shop or on-the-job site to form the frames. Considerable savings in both labor and material can be achieved if an improved flange system did not require the use of corner pieces.

It is therefore the principal object of the invention to provide an improved flange system that eliminates the necessity of using corner pieces to make the slip-on flange frames.

SUMMARY OF THE INVENTION

With the flange system of the invention, flange pieces are preformed to the proper length each with a male end and a female end that are notched and cut as a part of the forming operation. The flanges are identical, except for possibly the length which is determined according to the size of the rectangular duct sections that are to be joined. These preformed flange pieces are then provided to the installer who can assemble the flange frames and install them on the ends of the ducts. The male and female ends of the flange pieces are joined to form the corners, and the flange pieces are preformed with openings to receive standard fasteners so that the duct sections can now be joined together in the customary manner.

DESCRIPTION OF THE PREFERRED EMBODIMENT OF THE INVENTION

Figure 1:
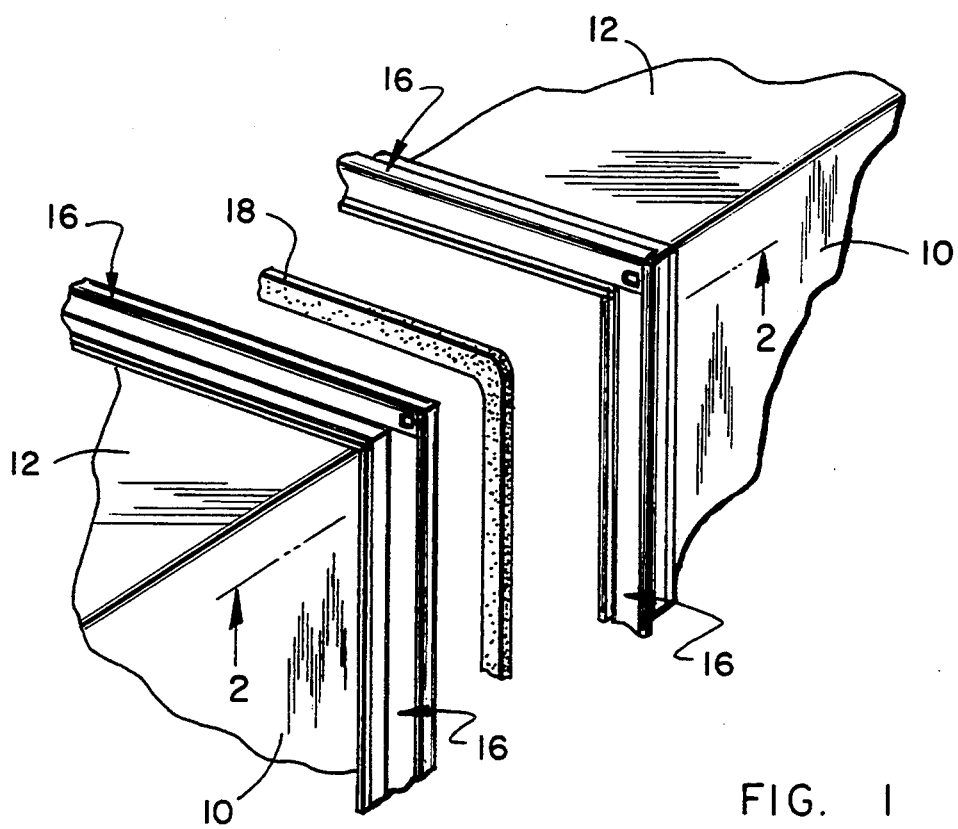
FIG. 1 is a perspective view of a typical duct section and showing the cornerless flange pieces of the invention in place prior to joinder of two duct sections.
Figure 2:
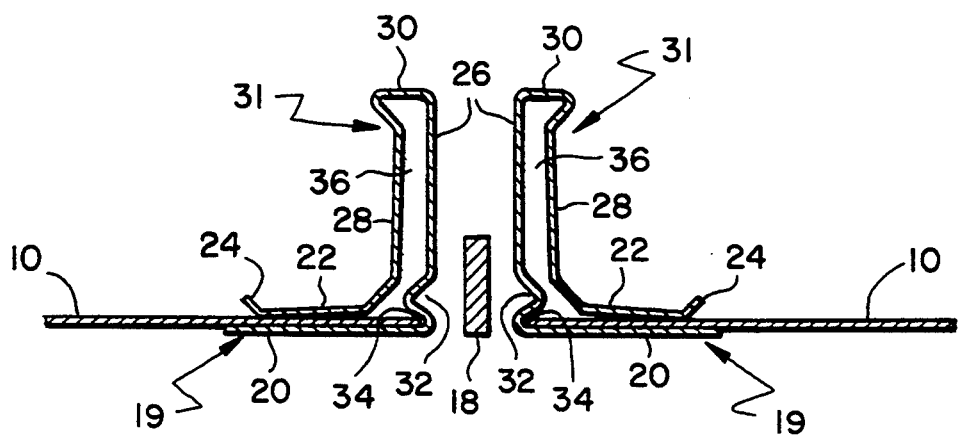
FIG. 2 is a sectional view taken on the line 2—2 of FIG. 1.
Figure 3:
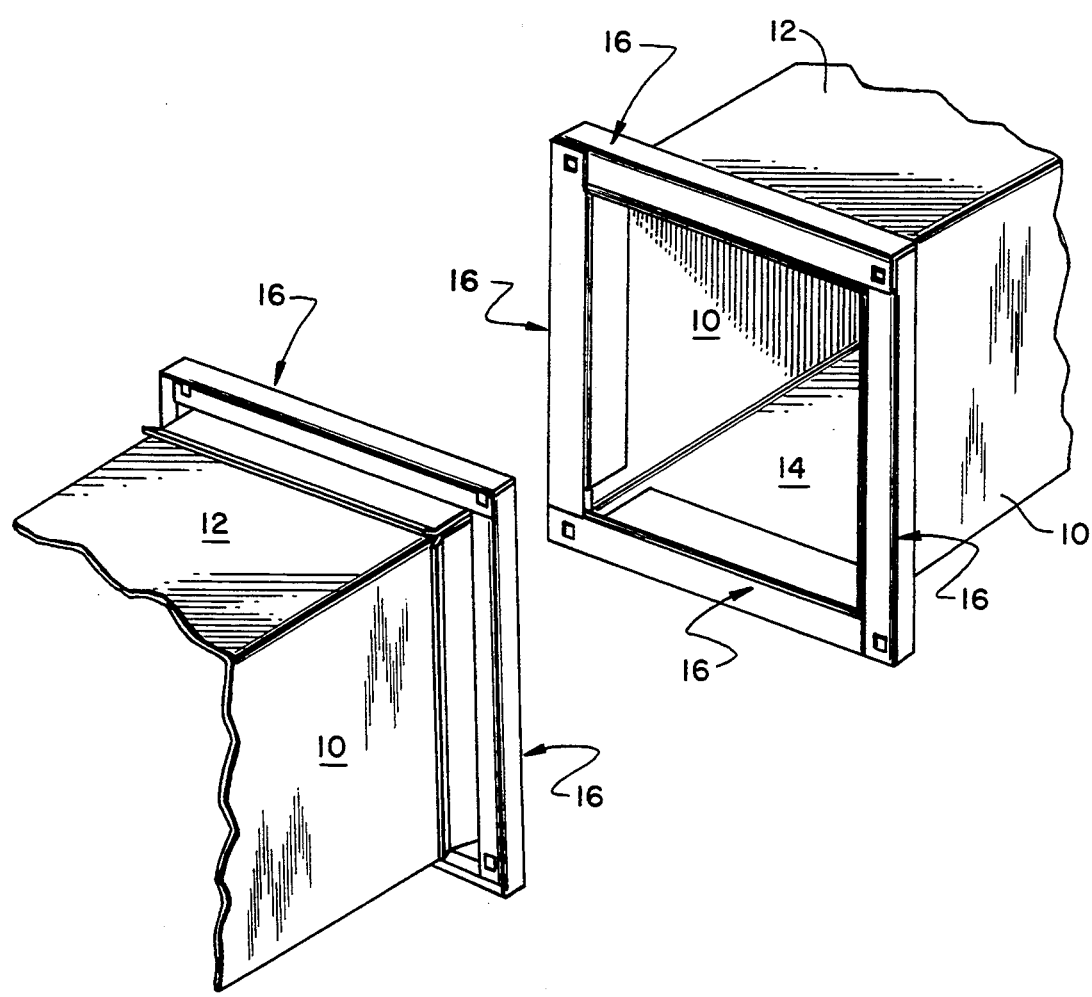
FIG. 3 is a perspective view similar to FIG. 1 but showing the complete duct sections with frees in place prior to joinder but with the gasket not shown.
Figure 4:
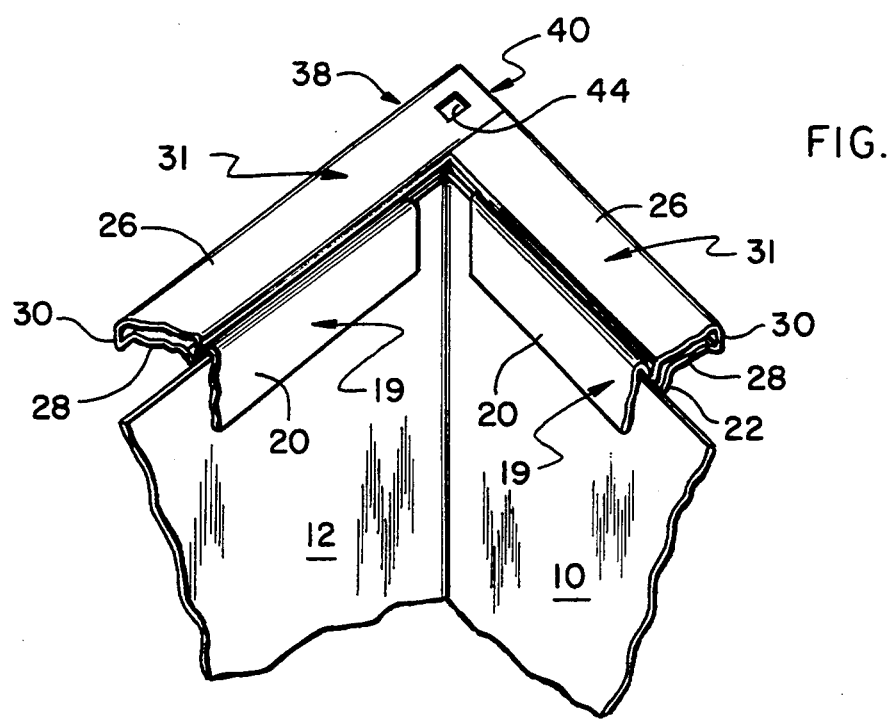
FIG. 4 is a perspective view from the inside of a duct section and illustrating details of the corner of a flange frame on a duct.
Figure 5:
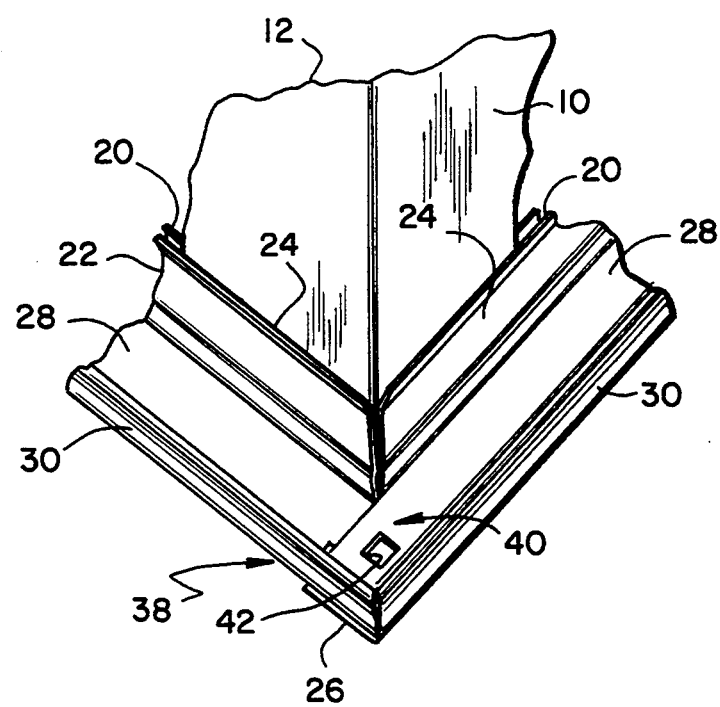
FIG. 5 is a perspective view from the outside of a duct section and illustrating details of the corner of a flange frame on a duct.
Figure 6:
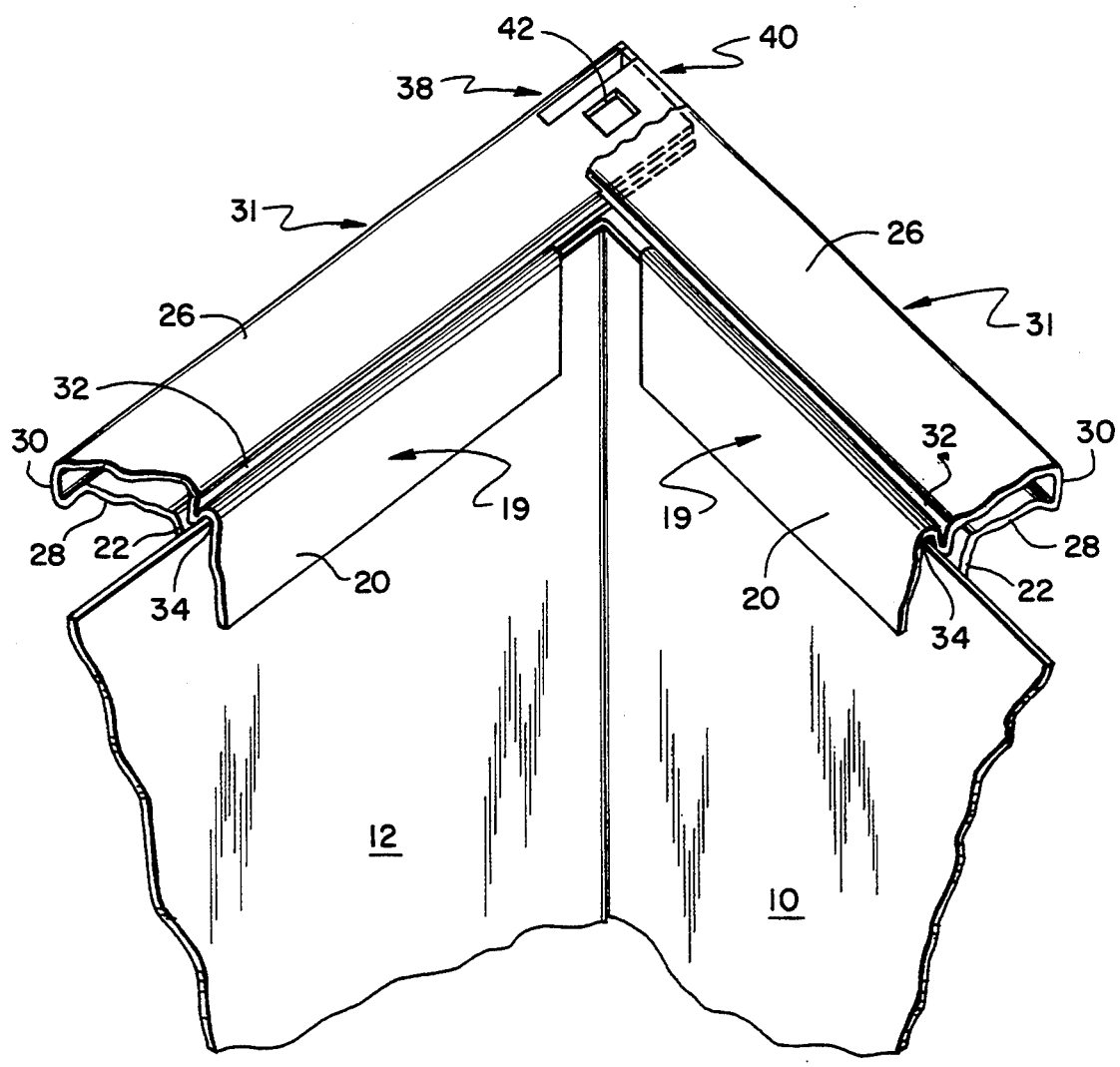
FIG. 6 is an enlarged view similar to FIG. 4 but showing a portion of one of the flange pieces broken away to show the connection.
Figure 7:
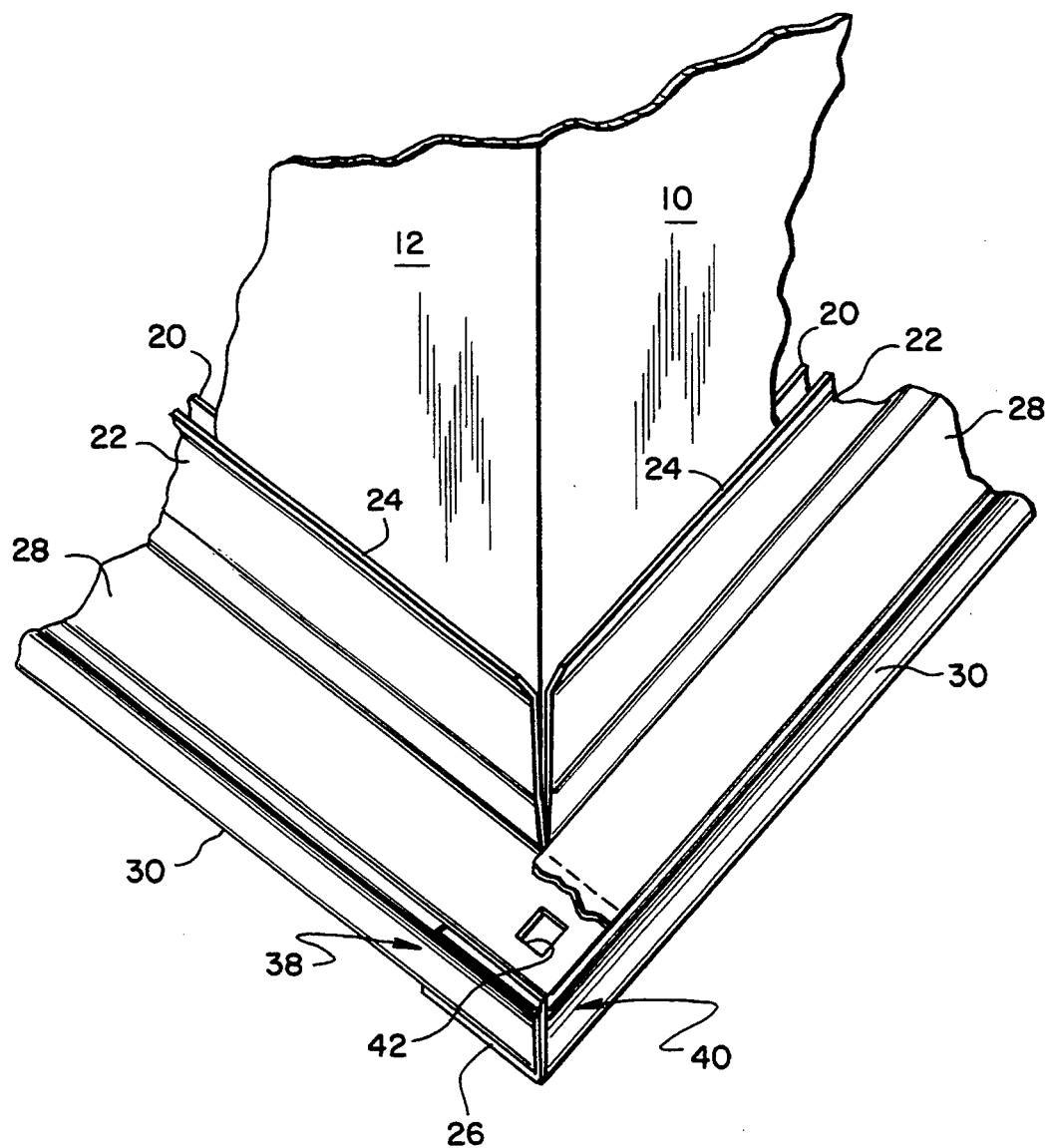
FIG. 7 is an enlarged view similar to FIG. 5 and showing a portion of one of the flange pieces broken away to further illustrate the connection.

Referring first to FIGS. 1, 2 and 3, there are illustrated two rectangular duct sections each having parallel spaced-apart side walls 10 joined to a top wall 12 and a bottom wall 14. The side walls 10, top wall 12 and bottom wall 14 are constructed of sheet material to form an enclosed duct for conveying conditioned air, as is well known to those skilled in the art. In order to create a duct system for conveying the conditioned air from a source to the places of discharge, or to return the air to the source for conditioning, a series of duct sections must be joined together and the joints sealed by the contractor or installer. In order to join the duct sections, flange pieces, each indicated generally by the reference numeral 16, are assembled to form a rectangular frame in the manner described hereinafter. After the frames are assembled, they are slipped over the edges of the side walls 10, top wall 12 and bottom wall 14 of the duct sections which are then connected together by the insertion of suitable fasteners (not shown) that interconnect the flange pieces 16 of one duct section to the flange pieces 16 of the other duct section. Preferably, a suitable gasket 18 or other sealant is positioned between the flange pieces 16 of duct sections to be joined so that when the duct sections are connected, an air tight seal will be formed.

FIG. 2 is a cross-sectional view illustrating the cross-sectional shape of the flange pieces 16. Although a particular configuration of flange pieces 16 has been illustrated, it will be understood that a variety of cross-sectional shapes are known and can be used in applying the principles of the invention. A relatively simple and common cross-sectional shape is illustrated in FIG. 2 for each of the flange pieces 16. As shown in FIG. 2, each of the flange pieces 16 includes a duct wall 19 having an inner portion 20 and an outer portion 22 spaced slightly apart with the free edge 24 of the outer portion 22 bent outwardly to facilitate reception between the portions 20 and 22 of a duct side wall 10, top wall 12 or bottom wall 14 as the case may be. The inner portion 20 of duct wall 19 is joined to an outwardly extending inner leg 26 which is joined to an outer leg 28 by edge 30 to form the frame wall 31. As best seen in FIG. 2, the inner leg 26 has an "S" shaped portion 32 formed along its entire length that provides a recess 34 that receives and locks the edge of the side wall 10, for example, into the duct wall 19.

The-inner leg 26, outer leg 28, edge 30 and inner portion 20 and outer portion 22 are all continuously formed in a well-known manner by a roll-forming operation to produce the desired configuration of a flange piece 16 as illustrated in the drawings. The flange pieces 16 that are described in the preferred embodiment disclosed herein are commonly known in the industry as "slip-on" flanges, and are used in connecting duct sections by slipping the flanges, when assembled into a frame, onto the edges of the walls of the duct sections. With prior art slip-on flange systems, L-shaped corner pieces must be used to join the flange pieces, these corner pieces being inserted into the space 36 (see FIG. 2) of adjoining flange pieces. The corner pieces are then connected by suitable fasteners to join the duct sections.

The slip-on flange system of the invention eliminates the necessity of corner pieces in making up the frames that connect the duct sections. To accomplish this, each flange piece 16 has a male end 38 and a female end 40. As best illustrated in the preferred embodiment of FIGS. 4, 5, 6 and 7, the male end 38 of a flange piece 16 is an extension of the inner leg 26 and outer leg 28 of the frame wall 31 beyond the inner portion 20 and outer portion 22 of the duct wall 19. In addition, the male end 38 has a slot 41 formed through both the inner leg 26 and the outer leg 28 along the edge 30. This slot 41 allows the outer edges of the inner leg 26 and outer leg 28 of-the female end 40 to fit tightly against the inside of the edge 30 of the male end 38 so as to close the corner without a gap. Similarly, the female end 40 is formed by extending the inner leg 26 and outer leg 28 of the frame wall 31 beyond the inner portion 20 and outer portion 22 of the duct wall 19. When two adjacent flange pieces 16 are joined to form a part of the duct frame, the inner leg 26 and outer leg 28 of the male end 38 are positioned inside the inner leg 26 and outer leg 28 of the female end 40 with the edges of the legs 26 and 28 abutting the inside of the edge 30 of the female end 40.

The male end 28 is provided with an opening 42 that extends through both the inner leg 26 and outer leg 28, and similarly the female end 40 has an opening 44 that extends through both the inner leg 26 and outer leg 28. Openings 42 and 44 are positioned so that when the male end 38 and female end 40 of adjoining flanges 16 are joined, the openings 42 and 44 will be in alignment. Since the flange pieces 16 are identical, when they are assembled into a frame and installed on the side walls 10, top wall 12 and bottom wall 14 by slipping the duct walls 19 over the edges of the duct, the male end 38 of one flange piece 16 (e.g. on a side wall 10) will be positioned inside the female end 40 of an adjacent flange piece 16 on the top wall 12, for example. When thus positioned, the openings 42 of the male end 38 of one flange piece 16 will be in alignment with the opening 44 of the female end 40 of the adjacent flange piece 16. These openings are for receiving standard suitable fasteners such as bolts (not shown) that will hold two duct sections tightly together. Of course, if desired, the flange pieces 16 forming the frame of one duct section can be joined to the flange pieces 16 forming the frame of another duct section of any suitable manner, such as by welding the frames together.

It will be obvious from the foregoing description that the specific notching of the flange pieces can be different than that disclosed herein in connection with the preferred embodiment and that the principles of the invention can be utilized with a variety of flange systems using flange pieces of well known and different cross-sectional shapes and designs. By utilizing the principles of the invention to form flange pieces with male and female ends that eliminate the need for corner pieces, frames can be formed more quickly and at a substantially reduced cost. This results in a considerable savings in both time and material because each set of four flange pieces that form a flange frame of the prior art slip-on systems requires four corners. Thus, each duct connection requires eight corners at a considerable increase in cost. Since the average duct system in a commercial building may require hundreds and even thousands of joint connections and since the cost of corners for a single connection may exceed $3.00, a substantial savings in material cost results.

In addition, labor required to produce the flange frames is substantially reduced. Flange pieces of the invention can be produced on a production roll-forming extruding line and are ready for assembly to the duct sections as manufactured. Once produced for a duct system of a particular size, the flange pieces require no further cutting prior to assembly and installation on the duct ends, thus eliminating scrap as well as the labor for cutting the pieces. Use of the slip-on flange system of the invention further reduces the possibility of injury since it eliminates the cutting operation in the shop or on the job-site and also reduces annoying noise that occurs during the cutting.

Having thus described the invention in connection with the preferred embodiment thereof, it would be evident to those skilled in the art that various revisions and modifications can be made to the flange pieces and system described herein without departing from the spirit and scope of the invention. It is my intention, however, that all such revisions and modifications that are obvious to those skilled in the art will be included within the scope of the following claims:

1. A cornerless slip-on flange system for connecting the ends of rectangular duct sections having four walls each of which terminates in a straight, flat end to form the duct section, said flange system comprising a plurality of flange pieces four of which are connectable to form a rectangular frame to be fitted on the ends of the walls of one of the duct sections to be connected, each flange piece having a duct wall for connection with the end of the wall of a duct section and a frame wall extending at substantially a right angle to the duct wall, the duct wall of each flange piece having an inner portion and an outer portion spaced from the inner portion to form a space for receiving the straight end of a wall of a duct section that is to be connected, the frame wall being connectable with the frame wall of another duct section to join the sections, and the frame wall of each flange piece having a male end and a female end, the male end of one flange piece being directly connectable with the female end of another flange piece when the flange pieces are positioned at a right angle to each other so as to form a frame without corner pieces, the frame being fitted on the ends of the walls of a duct section by slipping the end walls of a duct section into the respective spaces in the duct walls of the flange pieces, and the frame on the ends of the walls of one duct section being adapted to be connected with the frame on the ends of the walls of another duct section.

2. The cornerless slip-on flange system of claim 1 in which the frame wall of each flange piece has an inner wall and an outer wall spaced-apart from the inner wall, the frame wall at both the male end and the female end extending beyond the duct wall, the inner wall and the outer wall of the male end of one flange piece being insertable between the inner wall and outer wall of the female end of another flange piece to form a corner of a frame when two flange pieces are joined.

3. The cornerless slip-on flange system of claim 2 in which an opening is formed in and extends through the male end and the female end of each flange piece, the openings being located so that the opening in the male end of one flange piece will be in alignment with the opening in the female end of another flange piece when they are joined together to form a frame, the aligned openings being adapted to receive fastening means for connecting the frames of two duct sections.

* * * * *